United States Patent
Vuong

(10) Patent No.: US 6,901,458 B2
(45) Date of Patent: May 31, 2005

(54) MULTI-MODE SCSI BACKPLANE AND DETECTION LOGIC

(75) Inventor: Vinh T. Vuong, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 362 days.

(21) Appl. No.: 10/192,909

(22) Filed: Jul. 11, 2002

(65) Prior Publication Data

US 2004/0088616 A1 May 6, 2004

(51) Int. Cl.$^7$ ................................................ G06F 3/00
(52) U.S. Cl. ............................ 710/14; 710/18; 714/48
(58) Field of Search .............................. 710/14, 18, 19, 710/314, 300, 105; 713/300; 714/47, 48

(56) References Cited

U.S. PATENT DOCUMENTS

| | | | |
|---|---|---|---|
| 5,404,542 A | * | 4/1995 | Cheung ...................... 713/300 |
| 5,513,373 A | * | 4/1996 | Damkier ...................... 710/16 |
| 5,613,074 A | | 3/1997 | Galloway |
| 5,751,977 A | | 5/1998 | Alexander |
| 5,966,510 A | * | 10/1999 | Carbonneau et al. ......... 714/44 |
| 6,055,582 A | | 4/2000 | Pascarella et al. |
| 6,126,451 A | | 10/2000 | Zandy et al. |

* cited by examiner

*Primary Examiner*—Khanh Dang

(57) ABSTRACT

The present invention includes a multi-mode SCSI backplane and a detection logic that is used in conjunction with the backplane. In this invention, the SCSI backplane can be configured in different modes, included simplex mode and duplex mode. The detection logic can also detect when an illegal configuration is connected to the SCSI backplane and indicate the presence of the illegal configuration by triggering a light emitting diode (LED) or some other indicating mechanism. The detection logic is implemented with a handful of cost-effective field effect transistors (FETs), resistors and LEDs and no additional IC logic gates or Programmable Array Logic (PAL) is necessary.

15 Claims, 1 Drawing Sheet

MULTI-MODE SCSI BACKPLANE AND DETECTION LOGIC

CROSS REFERENCE TO RELATED PATENTS

The SCSI backplane of the present invention is related to the subject matter disclosed in U.S. Pat. No. 6,055,582, issued on Apr. 25, 2000 for: "SCSI Duplex-Ready Backplane for Selectively Enabling SCSI Simplex and Duplex Modes Based on Indication of Desired SCSI Mode" assigned to Compaq Computer Corporation, Houston, Tex., the disclosure of which is herein specifically incorporated in its entirety by this reference.

BACKGROUND OF THE INVENTION

1. Field of the Invention

The present invention relates, in general, to a multi-mode SCSI backplane, and to configuration logic that detects whether the SCSI backplane is configured for simplex or duplex mode, and also detects illegal cabling configurations.

2. Relevant Background.

The SCSI (small computer system interface) connection interface provides a fast, versatile way for PCs and servers to connect with a variety of storage devices including hard disk drives (HDDs), optical drives, and tape drives, among others. A common configuration for SCSI interfaces in servers includes a SCSI circuit board known as a backplane that typically includes SCSI connectors. In a typical configuration, the SCSI backplane is internal to a server box, and interfaces with the main motherboard of the server via a cabled SCSI connection. The SCSI controller circuitry is typically located on the server motherboard, the SCSI backplane, or both boards.

Multi-mode SCSI backplanes are designed to support multiple connection configurations including simplex mode configuration and duplex mode configuration. While multi-mode SCSI backplanes have the advantage of supporting multiple configuration modes on a single SCSI backplane, they also have added expense and design complications. For example, multi-mode SCSI backplanes typically have to incorporate complex logic such as Programmable Array Logic (PALs) in the backplane. Furthermore, multi-mode SCSI backplanes often use sideband signals through additional connector interfaces external to the SCSI interface.

Another problem occurs when an operator incorrectly attempts to connect peripheral devices to the SCSI backplane. These so called illegal configurations include illegal cabling configurations and improper termination of connectors that are not in use, among other errors. Illegal configurations can cause the SCSI interface to malfunction and may even result in permanent circuit damage.

SUMMARY OF THE INVENTION

The present invention includes a configuration logic circuitry for a multi-mode SCSI backplane comprising a SCSI connector coupled to the SCSI backplane, a fault output coupled to the first SCSI connector, and a mode output coupled to the first SCSI connector.

The present invention also includes a multi-mode SCSI backplane that includes configuration logic circuitry, said backplane comprising a SCSI connector that includes a first, second and third connector contact, wherein the first connector contact is coupled to a first gate of a first transistor, and said first transistor is also coupled to a mode output and the second connector contact, the second connector contact is coupled to a second gate of a second transistor, and said second transistor is also coupled to a fault output and a ground, and the third connector contact is coupled to a third gate of a third transistor, and said third transistor is also coupled to the fault output.

These and other features and advantages of the invention, as well as the structure and operations of various embodiments of the invention, are described in detail below with reference to the accompanying figures.

DETAILED DESCRIPTION OF THE PREFERRED EMBODIMENTS

Figure 1:
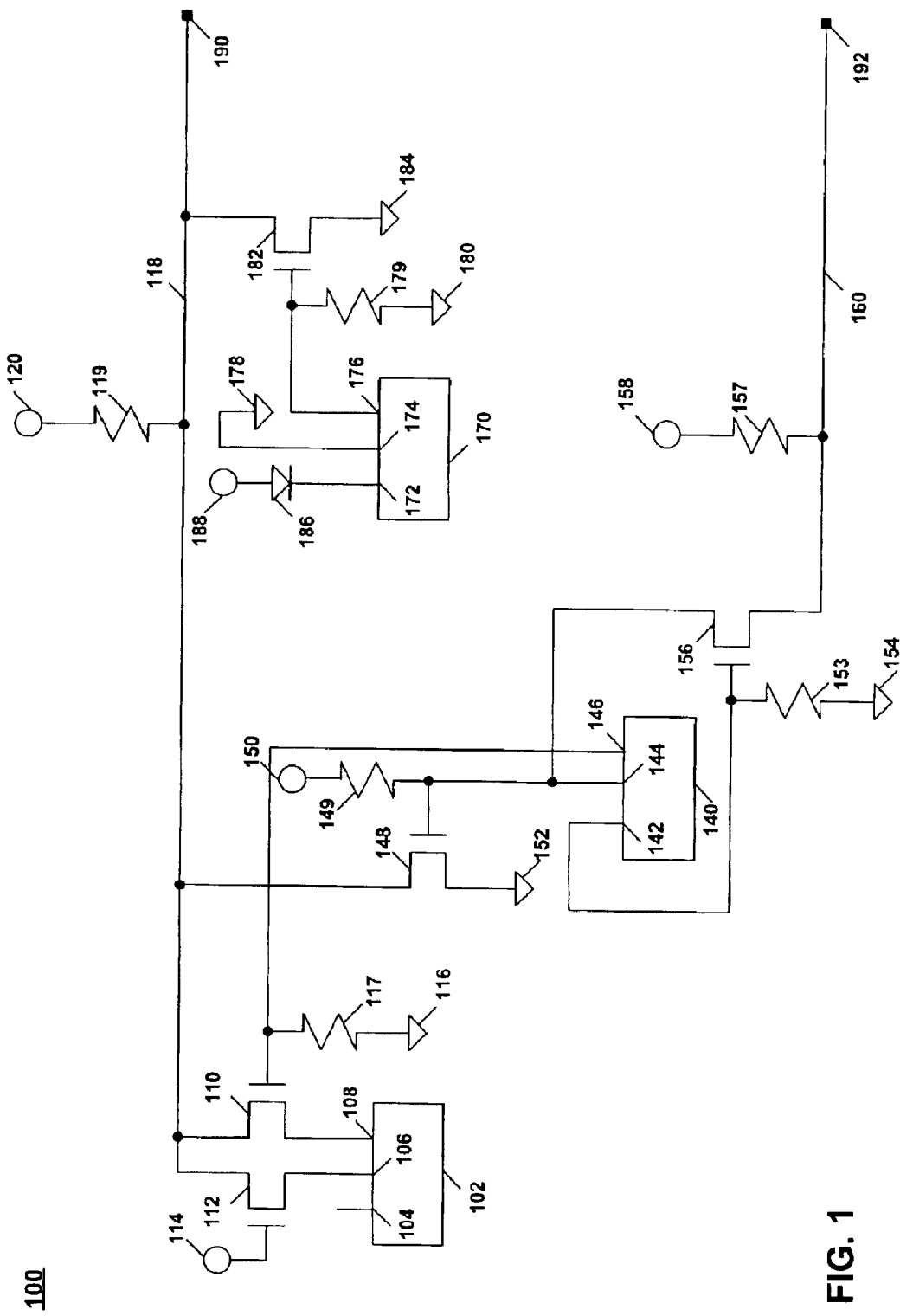
FIG. 1 shows a diagram for the detection logic used with the multi-mode SCSI backplane of the present invention.

While the invention is susceptible to various modifications and alternative forms, specific embodiments thereof are shown by way of example in the drawings above, and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The multi-mode SCSI detection logic of the present invention can be used to detect and indicate several configuration modes in a multi-mode SCSI backplane including a simplex configuration mode, a duplex configuration mode, and illegal configurations that may cause the SCSI backplane to malfunction. When the SCSI backplane is in simplex mode, the SCSI backplane supports a single SCSI bus. In duplex mode, the SCSI backplane includes two SCSI buses where each bus can support the same number of peripherals or a different number of peripherals.

Turning now to FIG. 1, a diagram of the detection logic 100 used with the SCSI backplane is shown. In this example, the logic 100 includes three SCSI connectors 102, 140 and 170, which for identification purposes are individually referred to as SCSI connector A 102, SCSI connector B 140, and SCSI connector C 170, and which can connect to peripherals, controllers, terminators, jumpers, or other circuitry. The SCSI connectors 102, 140, and 170 are standard 68-contact SCSI connectors, though other types of SCSI connectors, such as 50-contact and 80-contact SCSI connectors, can also be used.

The fault output 190 and the mode output 192 are coupled to all three SCSI connectors 102, 140 and 170. In this example, when the voltage level goes low on the fault output 190, a light emitting diode, or some other kind of indicator, is triggered to indicate that the logic 100 is detecting an illegal configuration. Similarly, when the voltage level goes low on the mode output 192, a light emitting diode, or some other kind of indicator, is triggered to indicate that the logic 100 detects that the SCSI backplane is in simplex mode. Other signaling conventions are contemplated by the present invention, such as indicating an illegal configuration when the voltage goes high on the fault output 190 and indicating the SCSI backplane is in simplex mode when the voltage goes high on the mode output 192.

In this example, three contacts on each of the SCSI connectors 102, 140 and 170 are coupled to the rest on the logic 100. Starting with SCSI connector A 102, a first A contact 104 of the connector 102 remains unconnected. The second A contact 106 is connected to the source side of transistor 112, while the drain side is coupled to line 118 which, in turn, is coupled to the fault output 190. The gate of transistor 112 is coupled to a power supply 114 that keeps the voltage on the gate high, typically about +5 volts, thereby keeping the transistor 112 open and allowing an electronic coupling of the second A contact 106 to line 118 and the fault output 190.

The third A contact 108 of SCSI connector 102 is coupled to the source side of transistor 110. The drain side of transistor 110 is coupled to line 118, while the gate of the transistor 110 is coupled to the third B contact 146 of SCSI connector 140. The gate of transistor 110 is also coupled via resistor 117 to ground 116 which normally keeps the voltage on the gate low, thereby keeping transistor 110 closed.

Turning now to SCSI connector B 140, the first B contact 142 is coupled to the gate of transistor 156 and ground 154 via resistor 153. The ground 154, which is also coupled to the gate of transistor 156 via resistor 153, normally keeps the gate at low voltage which, in turn, keeps the transistor 156 closed. The second B contact 144 is connected to the gate of transistor 148 and the source of transistor 156. The gate of transistor 148 is also connected to power supply 150 via resistor 149 that normally keeps the transistor 148 open and pulls line 118 low. As mentioned in the discussion of the SCSI connector A 102, the third B contact 146 is coupled to the gate of transistor 110 and ground 116.

Turning now to SCSI connector C 170, the first C contact 172 is coupled to diode 186 that, in turn is coupled to power supply 188. The second C contact 174 is coupled to ground 178. The third C contact 176 is coupled to the gate of transistor 182 and ground 180 via resistor 179. The gate of transistor 182 is also coupled to ground 180 via transistor 179, thus normally keeping the gate at low voltage and transistor 182 closed. When transistor 182 is closed, the ground 184 is not electronically coupled to line 118 and fault output 190.

In this example, a fault signal power supply 120 is coupled via resistor 119 to the fault output 190 through line 118 and a mode signal power supply 158 is coupled via resistor 157 to the mode output 192 through line 160. Both of these power supplies 120 and 150 normally keep high (typically about +5 Volts) the applied voltage on the fault output 190 and mode output 192.

All the transistors shown in this example are standard, n-type Field Effect Transistors (FETs), but the present invention contemplates examples where only p-type FETs are used as well as combinations of n-type and p-type FETs. Furthermore, the present invention contemplates using other types of switches and gates to control the path of signals in the logic 100.

An example of a multi-mode SCSI backplane based on the detection logic shown in FIG. 1 may be a dual SCSI bus backplane with a first SCSI bus originating at SCSI connector A 102 and ending at SCSI connector B 140, and a second SCSI bus that originates at SCSI connector C 170 and ends with terminators on the SCSI backplane. In one example, the first SCSI bus may be a 2-drive SCSI bus and the second SCSI bus may be a 4-drive SCSI bus. In this example, when the SCSI backplane is configured in simplex mode a jumper cable is connected between SCSI connectors B and C, 140 and 170, to join the first and second SCSI buses into a single, 6-drive SCSI bus that originates at SCSI connector A 102 and ends with terminators on the SCSI backplane that are coupled to SCSI connector C 170. When the SCSI backplane is configured in duplex mode a terminator board is connected to SCSI connector B 140 that terminates the first SCSI bus originating on SCSI connector A 102 and ending with the terminator board. Meanwhile, the second SCSI bus originates on SCSI connector C 170 and ends with terminators on the SCSI backplane.

In this example of the multi-mode SCSI backplane, GEM LED logic may support all the peripherals connected to the single, 6-drive SCSI bus when the SCSI backplane is in simplex mode. In addition, the GEM LED logic may support one of the two SCSI buses present when the SCSI backplane is in duplex mode. In duplex mode, the GEM LED logic may support the second, 4-drive SCSI bus and the first, 2-drive SCSI bus is not supported. The invention also contemplates additional GEM LED logic on the SCSI backplane for support of both SCSI buses when the SCSI backplane is in duplex mode.

Using the example shown in FIG. 1, the SCSI backplane can be configured for simplex mode by connecting SCSI connector B 140 and SCSI connector C 170 together with a jumper cable (not shown). Peripherals (not shown) may connect to the simplex configured SCSI backplane via connector A 102. The jumper cable provides electronic coupling between the first B contact 142 and first C contact 172, the second B contact 144 and the second C contact 174, and the third B contact 146 and the third C contact 176.

When the first B contact 142 and first C contact 172 are coupled, power supply 188 drives the voltage higher on the gate of transistor 156, which causes the transistor 156 to go from a closed to open state. When the second B contact 144 and second C contact 172 are coupled, the ground 178 is coupled to the source side of transistor 156, which drives the voltage low across the now open transistor 156, line 160 and mode output 192. Based on the signaling convention used in this example, the lower voltage at mode output 192 triggers a light emitting diode, or some other kind of indicator (not shown) to indicate that the logic 100 detects that the SCSI backplane is in simplex mode.

Connecting the jumper between the SCSI B connector 140 and SCSI C connector 170 couples the third B contact 146 and third C contact 176 which couples the ground 180 to the gate of transistor 110. The voltage applied to the gate of transistor 110 is normally kept low by ground 116 coupled to resistor 117, so connecting the gate to an additional ground 180 does not change normally closed state of transistor 110.

When the SCSI connectors B and C 140, 170 are jumpered together to put the SCSI backplane in simplex mode, the SCSI connector A 102 provides the connection to the single SCSI bus. The single SCSI bus may be coupled to LED blinking logic, such as Generic Equipment Model ("GEM") LED logic developed by the Semiconductor Equipment and Materials International (SEMI) standards organization, that provides blinking LED support to a wide variety of peripherals on the SCSI bus.

The SCSI backplane can be configured for duplex mode by connecting a terminator board to SCSI connector B 140. The terminator board includes a first terminator contact that may stay unconnected, a second terminator contact that may be connected to a ground on the terminator board, and a third terminator contact that may be connected to a power supply on the terminator board. These three contacts on the terminator board may be configured such that when the terminator board is connected to SCSI connector B 140, the first terminator contact may be coupled the first B contact 142, the second terminator contact may be coupled to the second B contact 144 and the third terminator contact may be coupled to a third B contact 146.

When the terminator board is connected to SCSI connector B 140 as described above, the first B contact 142 is not being driven and is left to be pulled low by ground 154 that is coupled to resistor 153. This results in the gate of transistor 156 also being at low voltage, opening gate 154. When the transistor 156 is open, the voltage on line 160 and mode output 192 remains high to signal that the backplane is in duplex mode.

When the SCSI backplane in this example is in duplex mode, SCSI connector A 102 provides access to a first duplex SCSI bus, and SCSI connector C 170 provides access to a second duplex SCSI bus. The first duplex SCSI bus supports up to 2 peripherals, while the second duplex SCSI bus supports up to 4 peripherals and includes LED blinking logic, such as GEM LED logic. While the first duplex SCSI bus in this example does not include blinking LED logic, the present invention contemplates modifications that provide such logic to the first duplex SCSI bus.

Illegal configurations of peripherals and other circuitry connected to one of the SCSI buses can also be monitored. Illegal configurations can include, for example, a terminator board installed in the wrong SCSI connector, the wrong controller connected to the first SCSI bus when the SCSI backplane is in duplex mode, a missing terminator that results in an unterminated bus, and improper termination of a peripheral. When an illegal configuration is detected, the voltage applied to the fault output 190 goes low which triggers a light emitting diode, or some other kind of indicator that the SCSI backplane is configured in an incorrect manner and that a SCSI bus may fail to operate properly.

One example of a SCSI configuration that may trigger a fault condition at fault output 190 is when a terminator board is improperly installed on SCSI connector A 102 while the SCSI backplane is configured in simplex mode. With the terminator board installed in SCSI connector A 102 the voltage on second A contact 106 will be driven low because the second terminator contact is coupled to a ground. Since the gate of transistor 112 is coupled to power 114, transistor 112 remains closed. Therefore, the fault output 190 is driven low by the grounding of the second A contact 106, triggering a fault condition on the SCSI backplane.

Another example of a SCSI configuration that may trigger a fault condition at fault output 190 is a jumper cable is improperly installed between SCSI connector A 102 and SCSI connector C 170. Here, when the jumper cable is installed between the two connectors, the voltage on second A contact 106 is driven low by ground 178 that is coupled to the second C contact 174. Similar to the example above, the low voltage on the second A contact 106 drops the voltage at the fault output 190, triggering a fault condition on the SCSI backplane.

Another example of a SCSI configuration that may trigger a fault condition at fault output 190 is the connection of a jumper cable improperly installed between SCSI connector A 102 and SCSI connector B 140. In this configuration, the gate of transistor 148 remains a high voltage, and the transistor 148 remains closed. Ground 152 is able to drive the voltage on fault output 190 low, triggering a fault condition on the SCSI backplane.

Another example of a SCSI configuration that may trigger a fault condition at fault output 190 is the connection of a terminator board to SCSI connector A 102 or SCSI connector C 170 while the SCSI backplane is in mode. For example, when a terminator board is connected to SCSI connector C 170, the third C contact 176, is coupled to power on the third terminator contact. The high voltage on third C contact 176 results in high voltage on the gate of transistor 182, closing the transistor and driving the fault output 190 low due to the ground 184. The low voltage on the fault output 190 triggers a fault condition on the SCSI backplane.

In another example of a SCSI configuration that may trigger a fault condition, a PCI controller is connected to SCSI connector A 102 while the SCSI backplane is in duplex mode. In this example, the PCI controller has a first PCI contact connected to power, a second PCI contact that is not connected, and a third PCI contact that is connected to a ground. When the PCI controller is connected to SCSI connector A 102, the first PCI contact is coupled to the first A contact 104, the second PCI contact is coupled to the second A contact 106, and the third PCI contact is coupled to the third A contact 108. When the third A contact 106 is coupled to the third PCI contact, the voltage on the third A contact 108 is driven low due to the third PCI contact being connect to a ground. As a result, the voltage across transistor 110 goes low, and also pulls down the voltage of line 118 and the fault output 190, triggering a fault condition on the SCSI backplane.

One example of the present invention has the SCSI connectors 102, 140 and 170 shown in FIG. 1 as 68-contact SCSI connectors that have connector contact assignments in conformity with the SCSI Parallel Interface-2 (SPI-2) standard and locates first contacts A, B and C 104, 142 and 172, respectively, at connector contact #52; second contacts A, B and C 106, 144 and 174, respectively, at connector contact #19 and third connector A, B and C 108, 146 and 176, respectively, at connector contact #20.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A configuration logic circuit for a multi-mode SCSI backplane comprising:
   first and second SCSI connectors coupled to the SCSI backplane;
   a fault output coupled to the first SCSI connector;
   a mode output coupled to the second SCSI connector; and
   wherein the second SCSI connector comprises:
     a first contact configured to open and close a first transistor, wherein the first transistor is connected to the mode output; and
     a second contact configured to open and close a second transistor, wherein the second transistor is connected to the fault output.

2. The configuration logic circuit of claim 1, wherein the first transistor selectively couples the second contact to the mode output.

3. The configuration logic circuit of claim 1, wherein the second transistor selectively couples fault output to ground.

4. The configuration logic circuit of claim 1, wherein said circuit comprises a fault indicator coupled to the fault output that indicates when an illegal configuration is coupled to the SCSI backplane.

5. The configuration logic circuit of claim 4, wherein said fault indictor comprises a light emitting diode.

6. The configuration logic circuit of claim 1, wherein said circuit comprises a mode indicator coupled to the mode output that indicates a configuration made for the SCSI backplane.

7. The configuration logic circuit of claim 6, wherein said mode indicator comprises a light emitting diode.

8. The configuration logic circuit of claim 1, wherein said circuit does not include any programmable array logic (PAL) circuitry.

9. A multi-mode SCSI backplane that includes configuration logic circuitry, said backplane comprising:
   a SCSI connector that includes a first, second and third connector contact,
   wherein the first connector contact is coupled to a first gate of a first transistor, and said first transistor is also coupled to a mode output and the second connector contact;
   the second connector contact is coupled to a second gate of a second transistor, and said second transistor is also coupled to a fault output and a ground; and
   the third connector contact is coupled to a third gate of a third transistor, and said third transistor is also coupled to the fault output.

10. The multi-mode SCSI backplane of claim 9, wherein said SCSI backplane does not include programmable array logic (PAL) circuitry.

11. The multi-mode SCSI backplane of claim 9, wherein said SCSI connector is a 68-contact SCSI connector that conforms with the SCSI Parallel Interface-2(SPI-2) connector contact configuration, and wherein said first connector contact has contact address number 52, said second connector contact has contact address number 19 and said third connector contact has contact address number 20.

12. The multi-mode SCSI backplane of claim 9, wherein said first, second and third transistors are field effect transistors.

13. The multi-mode SCSI backplane of claim 9, wherein said fault output is coupled to a light emitting diode that indicates when there is an illegal configuration on the SCSI backplane.

14. The multi-mode SCSI backplane of claim 9, wherein said mode output is coupled to a light emitting diode that indicates a mode for the SCSI backplane.

15. The multi-mode SCSI backplane of claim 14, wherein said mode is simplex mode or duplex mode.

* * * * *

UNITED STATES PATENT AND TRADEMARK OFFICE
CERTIFICATE OF CORRECTION

PATENT NO. : 6,901,458 B2 Page 1 of 1
APPLICATION NO. : 10/192909
DATED : May 31, 2005
INVENTOR(S) : Vinh T. Vuong It is certified that error appears in the above-identified patent and that said Letters Patent is hereby corrected as shown below:

Claim 6, Column 6, line 66, delete "made" and insert therefor --mode--

Signed and Sealed this

Twenty-third Day of June, 2009

JOHN DOLL
*Acting Director of the United States Patent and Trademark Office*